United States Patent
Müller et al.

(10) Patent No.: US 12,338,823 B2
(45) Date of Patent: Jun. 24, 2025

(54) ELECTRIC MOTOR AND VACUUM PUMP

(71) Applicant: VACUUBRAND GMBH + CO KG, Wertheim (DE)

(72) Inventors: Tobias Müller, Wertheim (DE); Christian Fehn, Unterbalbach (DE); Frank Gitmans, Wertheim (DE)

(73) Assignee: VACUUBRAND GMBH + CO KG, Wertheim (DE)

( * ) Notice: Subject to any disclaimer, the term of this patent is extended or adjusted under 35 U.S.C. 154(b) by 233 days.

(21) Appl. No.: 17/916,185

(22) PCT Filed: Feb. 16, 2021

(86) PCT No.: PCT/EP2021/053728
§ 371 (c)(1),
(2) Date: Sep. 30, 2022

(87) PCT Pub. No.: WO2021/197704
PCT Pub. Date: Oct. 7, 2021

(65) Prior Publication Data
US 2023/0151814 A1   May 18, 2023

(30) Foreign Application Priority Data

Mar. 31, 2020 (DE) .................. 10 2020 108 924.4
Jul. 22, 2020 (DE) .................. 10 2020 119 335.1

(51) Int. Cl.
*F04C 25/02* (2006.01)
*F04C 18/10* (2006.01)
(Continued)

(52) U.S. Cl.
CPC .............. *F04C 25/02* (2013.01); *F04C 18/10* (2013.01); *F04C 18/16* (2013.01); *H02K 16/02* (2013.01);
(Continued)

(58) Field of Classification Search
CPC .......... F04C 25/02; F04C 18/10; F04C 18/16; F04C 2240/40; F04C 2240/60;
(Continued)

(56) References Cited

U.S. PATENT DOCUMENTS 5,779,453 A * 7/1998 Nagayama .......... F04C 29/0085
417/373
7,338,266 B2 * 3/2008 Miyashita ............... F04C 18/16
418/201.3
(Continued)

FOREIGN PATENT DOCUMENTS

CN    106089708 A  * 11/2016
CN    110341448 A  * 10/2019  ............. B60K 1/02
(Continued)

OTHER PUBLICATIONS

Machine Translation of CN_106089708_A (Year: 2016).*
(Continued)

*Primary Examiner* — Oluseye Iwarere
*Assistant Examiner* — Charlie Frank Mann, Jr.
(74) *Attorney, Agent, or Firm* — Calderon Safran & Wright P.C.; David S. Safran (57) ABSTRACT

An electric motor, in particular for a vacuum pump, with two magnetically coupled shafts. A correction force can be set on each shaft by means of adjusting magnet devices, whereby negative effects due to errors in the magnetic coupling can be compensated.

16 Claims, 4 Drawing Sheets

(51) Int. Cl.
*F04C 18/16* (2006.01)
*H02K 16/02* (2006.01)
(52) U.S. Cl.
CPC ...... *F04C 2240/40* (2013.01); *F04C 2240/60* (2013.01); *H02K 2213/09* (2013.01)
(58) Field of Classification Search
CPC .... H02K 49/10; H02K 49/102; H02K 49/104; H02K 49/106; H02K 16/02; H02K 2213/09
USPC ............. 310/103, 106, 109, 112, 114, 49.42, 310/49.38
See application file for complete search history.

(56) References Cited

U.S. PATENT DOCUMENTS

2013/0183185 A1    7/2013  Dirscherl et al.
2019/0326042 A1*  10/2019  Takagi ...................... C09J 5/06

FOREIGN PATENT DOCUMENTS

DE        10018728 A1 *  10/2001  .......... B41F 13/0045
EP         1085644 B1 *   7/2009  ............... B60K 6/26
EP         2642127 A1 *   9/2013  ............. F01C 17/00
JP          S5146418 A      4/1976
KR     20190081552 A *   7/2019

OTHER PUBLICATIONS

Machine Translation of EP_1085644_B1 (Year: 2009).*
Machine Translation of CN_110341448_A (Year: 2019).*
Machine Translation of EP_2642127_A1 (Year: 2013).*
Machine Translation of KR_20190081552_A (Year: 2019).*
Machine Translation of DE_10018728_A1 (Year: 2001).*

* cited by examiner

ELECTRIC MOTOR AND VACUUM PUMP

BACKGROUND OF THE INVENTION

Field of the Invention

The invention relates to an electric motor in particular a two-shaft synchronous motor, preferably for operating a vacuum pump, with two rotor magnet devices respectively arranged on shafts running in particular parallel, the rotor magnet devices being arranged in a common stator in the operating state of the electric motor in such a way that they interact with one another for mutual coupling with regard to their rotational angular position, The invention also relates to a vacuum pump, in particular a rotary lobe pump or screw pump, preferably with a pumping speed below 50 m$^3$/h, with at least one such electric motor for rotating at least two displacement elements.

Description of the Related Art

An embodiment of an electric motor frequently used in industry is that of a multiple-shaft electric motor, which is used to synchronously drive a plurality of shafts. A typical application, especially for electric motors with two shafts, are pumps in which two displacement elements rotating against each other effect the pump's output. These include in particular screw pumps, Roots pumps, and screw compressors. In the aforementioned pumps, the shafts run in opposite directions. The displacement elements, for example screw spindles, engage with each other as tightly as possible during the rotational movement. However, they must not actually touch each other during this process, as this would have negative effects during operation in the form of increased wear, noise generation and power consumption. Particularly in view of the frequently high rotational speed of such pumps, it is therefore important to ensure precise manufacturing as well as accurate balancing and alignment of the moving components. Due to the required tightness, the gap widths in the area of the displacement elements are extremely small. As a result, only small manufacturing tolerances are envisaged and there are high requirements for the synchronism of the rotational movement of both shafts.

Various approaches to synchronizing the two shafts are already known from the prior art. For example, the shafts can be coupled mechanically, for example, by means of a toothed gear. In this case, it is often sufficient to drive only one shaft, with the other shafts being driven via the gearbox. The disadvantage here, however, is that the mechanical contact of the components of the coupling element causes the problems mentioned above, i.e., an increase in wear, operating noise and power consumption. In addition to the comparatively large space requirement, this solution often also requires adequate lubrication, which in turn necessitates a reliable and at the same time durable seal to the pump chamber. Due to the high design effort, this approach is relatively cost-intensive.

An alternative is a purely electronic control of the speeds of the shafts and their relative phase. However, very precise control with low latency times is required here, particularly with regard to high speeds. Apart from a correspondingly powerful electronic control system, the design effort is comparatively high due to the complex sensor equipment for both shafts.

The disadvantages of the above solutions are partly overcome by an approach that uses a motor in which both shafts are arranged in a common stator field. Here, the stator field acts simultaneously on two rotor magnet devices, each of which is connected to a shaft. Thus, both rotor magnet devices always experience any fluctuations of the stator field in the same way. This largely avoids corresponding synchronization fluctuations.

A coupling of the rotational movement of the shafts is further achieved by an adjacent arrangement of the rotor magnet devices, which in this respect form a magnetic transmission.

The problem here, however, is that two magnetic fields—the stator field and the magnetic field of the other rotor magnet device—act on each rotor magnet device basically independently of each other. Since there are limits to the accuracy of adjustment in practice, the situation can arise here that, with regard to the alignment of the shafts, the rest position relative to a static stator field does not correspond exactly to the rest position with regard to the magnetic interaction of the rotor magnet devices with each other. The field strength of the stator field is usually higher than the coupling effect of the rotor magnet devices to each other. Therefore, when the stator field is active, the two shafts in the case described above are always offset by a certain angle of rotation with respect to their rest position relative to each other.

Similar to the situation with a tensioned spring, there is a tension between the rotor magnet devices in the form of a force which is transmitted to the shafts as a relative torque. This remains even when the stator field changes, i.e., when the shaft is driven. When the pump is operated in this situation, a superimposed rotational vibration can arise from minor synchronization fluctuations, which impairs the synchronous rotation of the shafts and can thus lead to considerable disturbances. Such rotational vibrations occur in a problematic manner especially in comparatively small systems with relatively long shafts or in systems with one-sided bearings. Furthermore, plastics such as PEEK are often used for the manufacture of pump components due to their chemical resistance. Compared to metallic materials, however, plastics generally have a lower density and higher elasticity, which favors the formation of vibrations in the material.

Since the rotation of the shafts cannot be electronically controlled individually in the case of a common stator field, alternative possibilities must be resorted to in order to counteract the disruptive rotational vibration. For example, the amplitude of this rotational vibration can be limited by a mechanical emergency gear that normally runs along without contact. In this case, relative rotation of the shafts is stopped, for example, by contact between intermeshing gearwheels. However, this leads on the one hand to considerable noise generation and on the other hand to increased maintenance requirements due to the wear of the gears after a short time.

Further, damping the rotational vibration by shifting the resonant frequency would require in particular an adjustment of the mass of the components involved. However, this approach is not equally effective for all speeds. In addition, a design that is too light is associated with structural instability, while a design that is too massive leads to an undesirable increase in energy requirements.

SUMMARY OF THE INVENTION

Against this background, the present invention is based on the problem of providing an electric motor with two shafts in which the rotation of the shafts is particularly reliably synchronized and in which, in particular, the problems described above are avoided.

The aforementioned problem is solved by an electric motor with the features according to claim 1 as well as by a vacuum pump with the features according to claim 13.

By means of at least one adjusting magnet device on each of the two shafts of the electric motor according to the invention, the magnetic tension in the form of a force acting between the rotor magnet devices of both shafts as described above can be compensated. For this purpose, a counter-torque is generated between the two shafts by the magnetic interaction of the adjusting magnet device of one shaft with a complementary adjusting device of the respective other shaft. The counter-torque here preferably acts as a corrective in the sense that, when the stator field is active, at least essentially no force acts between the rotor magnet devices that is based on a shift in the angle of rotation relative to each other compared to the relative rest position.

The adjusting magnet device preferably has a structure similar to the rotor magnet devices. For example, the adjusting magnet device comprises at least one magnet whose magnetic poles can interact with the magnetic poles of a magnet of a complementary adjusting magnet device. However, the number, arrangement and/or orientation of the magnets can be individually different. In particular, an annular, preferably equidistant arrangement of magnets or magnet poles around the shaft has proven to be particularly suitable.

In terms of relative rotation, the torque caused by the angular displacement corresponds to the deflection against a spring force in a system capable of oscillation. If the resulting torque is almost zero, the system at hand does not tend to develop a superimposed rotational oscillation even at high speeds, which can build up to a critical range depending on the resonance conditions. If the amplitude of such a rotational oscillation becomes too large, the magnetic coupling between the rotor magnet devices can get out of sync, so that the synchronous running of both shafts is no longer guaranteed. In the case of a pump, for example, this can lead to a collision of rotating displacement elements, which in addition to increased wear and an increase in operating noise can in serious cases also result in the failure of the pump.

If relative synchronization fluctuations occur between the shafts during operation, the adjusting magnet devices are rotated relative to each other. According to the invention, this causes an increase in the corrective force between the respective magnetic poles of the adjusting magnet devices, which counteracts the formation of a rotational vibration without wear.

The group of all components which rotate with the shaft during operation of the pump is collectively referred to as the "rotor" in the context of the present invention. In addition to the shaft as such, this also includes in particular the rotor magnet devices, adjusting magnet devices, any displacement elements and/or other components associated with the shaft which are connected to the shaft or other parts of the rotor in such a way that they rotate with the electric motor during operation.

The extent to which the two rotors are tensioned against each other, i.e., rotationally displaced, in relation to their mutual magnetic interaction depends essentially on the unavoidable tolerances in the manufacture of the components and in the assembly of the electric motor. This dimension can therefore hardly be predicted precisely. For this reason, at least one of the adjusting magnet devices is rotatably mounted on the associated shaft in such a way that it can be adjusted relative to the latter by means of rotation. Alternatively or additionally, the adjustability of the adjusting magnet device can be expressed by the fact that it is variable in its rotational angular position relative to a complementary adjusting magnet device of the respective other shaft. Thus, a specific adjustment of the correction position of the adjusting magnet devices can be carried out depending on the individual case.

Although it is not absolutely necessary for both interacting adjusting magnet devices of a complementary pair to be adjustable in the aforementioned manner, this is provided in a preferred embodiment. This makes it easier to set the correct compensation position of the adjusting magnet device(s). Furthermore, the handling of the device can be supported, for example, if due to structural conditions one of the adjusting magnet devices is difficult to reach for a user.

As in the case of the rotor magnet devices, the mutual influence of the adjusting magnet devices preferably also causes the rotors to be coupled according to the principle of a magnetic gear. In addition to their balancing effect, for example, to avoid superimposed rotational vibrations as mentioned, the adjusting magnet devices also contribute in this way to stable synchronization of the rotors.

In addition to the actual magnetically interacting components, i.e., one or more magnets, the adjusting magnet devices can also comprise further elements which serve, for example, for fastening to the shaft, cohesion of the magnets and/or, in particular, adjustability in the form of rotation and/or axial displacement. The same applies to the rotor magnet devices.

The rotors of the electric motor according to the invention or of a pump with the electric motor according to the invention can, in addition to the rotor magnet devices arranged as part of the drive in the stator field and the adjusting magnet devices, also have further rotor magnet devices outside the stator which serve for further magnetic coupling of the rotors. According to the invention, a combined design of an adjustable adjusting magnet device with a rigid rotor magnet device is also possible. In this case, a part adjustable by rotation relative to the shaft preferably fulfills the above-mentioned function of the adjusting magnet device, i.e. in particular the static and/or dynamic compensation of an unwanted relative torque of the rotors with respect to each other, while a part rigidly connected to the shaft serves merely to reinforce the relative coupling of the rotors.

It is understood that a plurality of adjusting magnet devices can also be provided per shaft. In particular, the adjusting magnet devices of a shaft are designed differently, for example by comprising a different number of magnets. In this way, a more precise setting of the compensating force or the compensating torque can be made in some applications.

Preferably, at least one of the adjusting magnet devices of each shaft is arranged outside the stator. This means that the adjusting magnet device is not subjected to any additional force from the stator field. The balancing function of the adjusting magnet device can thus be performed independently of the other forces acting on the rotor.

In functional terms, a distinction must be made between a corrective force acting between the adjusting magnet devices and a coupling force acting between two complementary rotor magnet devices. This distinction is not contradicted by the fact that coupling also occurs through the interaction of complementary adjusting magnet devices. The corrective force results in particular from the specific setting of a relative angle of rotation between the adjusting magnet devices. When the rotor rotates during operation, the correction force between two adjusting magnet devices is preferably phase-shifted with the coupling force between two rotor magnet devices. A bias with respect to the coupling force can, for example, lead to an acceleration of the rotational movement of the rotor, which is inhibited by the phase-shifted correction force.

The coupling force nominally serves only to synchronize the rotors. The correction force thus has the particular function of compensating for errors in the height, alignment and/or phase of the coupling force. These errors can be both static and dynamic in nature. In the latter case, the compensation prevents, for example, the formation of a superimposed rotational vibration as explained above.

In a preferred embodiment, the corrective force between the complementary adjusting magnet devices is greater than or equal to a coupling force acting between two complementary rotor magnet devices. In this way, the compensating correction force can have a particularly effective effect. In particular, if the maximum achievable correction force is significantly greater than the coupling force, relative synchronization fluctuations and superimposed rotational vibrations are quickly damped, preferably before a rotational vibration builds up to a significant extent or the relative rotational displacement of the rotors with respect to each other reaches a critical level.

In the simplest embodiment, a rotor magnet device and/or an adjusting magnet device of the electric motor according to the invention has only one magnet. However, an embodiment with a plurality of magnets is particularly preferred in order to ensure a reliable coupling of the rotors in the case of the rotor magnet devices and furthermore a more precise adjustment in the case of the adjusting magnet devices. The magnet or magnets can be installed or attached, in particular glued, to the rotor magnet device or adjusting magnet device as a whole and/or made up of individual parts in the sense of a multi-part embodiment. The manufacture of the corresponding components is thus possible in a simple and inexpensive manner Preferably, sintered and/or plastic-bonded magnets are used.

At least one of the rotor magnet devices and/or at least one of the adjusting magnet devices preferably comprises a magnetic multipole. Since each magnet itself already represents a dipole, the term magnetic multipole herein refers to embodiments comprising at least one magnetic quadrupole, i.e., embodiments in which at least four magnetic poles are provided. However, a magnetic multipole of higher order, preferably an at least eightfold multipole, further preferably an at least 12-fold multipole, particularly preferably an at least 24-fold multipole, is particularly preferred. According to the invention, however, the number of magnetic poles is not limited upwards. In principle, an n-fold multipole in the sense of a multipole of any order can be used. Depending on the number of poles of a rotor magnet device or adjusting magnet device, a correspondingly more precise coupling of the rotors or a finer adjustment of the adjusting magnet device can be achieved to compensate for the distortion described above.

It is understood that rotor magnet devices and/or adjusting magnet devices in the electric motor according to the invention do not always have to have the same number of magnets or magnetic poles. However, rotor magnet devices and/or adjusting magnet devices which are complementary to each other preferably correspond to each other in the number of their magnets or magnetic poles and/or their other design. In particular, an at least substantially identical or symmetrical design of the complementary rotor or adjusting magnet devices of a pair is preferred.

With regard to a low design effort, permanent magnets in particular are suitable for use in a rotor magnet device and/or an adjusting magnet device. In addition to low-cost iron magnets, neodymium-containing magnets are particularly preferred, as they are characterized by high remanence and are therefore especially suitable for small-scale designs of the rotor or adjusting magnet devices. As an alternative to or in addition to permanent magnets, an adjusting magnet device can also have an electromagnet. This allows not only the relative position of the adjusting magnet device to a complementary adjusting magnet device of the respective other rotor to be adjusted, but also the field strength and thus the correction force to be set.

Furthermore, the design as an electromagnet allows the adjusting magnet device to be switched on and off as required, should this be necessary. For example, in connection with an electronic control of the electric motor, in particular with regard to the speed, corrective action can be taken by switching on the electromagnetic effect of the adjusting magnet device, if synchronism fluctuations or asynchronies are detected. In particular, the occurrence of a superimposed rotational vibration can thus be suppressed at an early stage, preferably before the vibration amplitude reaches a critical level, which would disrupt proper operation.

With regard to the rotational movement, at least one of the adjusting magnet devices has a cylindrical base body. Here, the longitudinal axis of the cylinder runs in particular parallel to the axis of rotation of the shaft of the rotor and preferably coincides with it. The magnetic poles of the adjusting magnet device can preferably be arranged equidistantly around the cylinder barrel.

Alternatively, or additionally, at least one of the adjusting magnet devices can also deviate from a pure cylindrical shape, in particular by the adjusting magnet device having a radially projecting, preferably annular, element or several such elements, in particular spaced axially from one another. In principle, magnets or the position of the magnetic poles can thus be shifted radially further outwards so that the distance between adjusting magnet devices of the two rotors is reduced without increasing the diameter of the adjusting magnet device as a whole, i.e., over the entire axial length. In this way, the moment of inertia of the adjusting device is kept comparatively low despite the magnetic poles being moved further outwards, and the risk of disturbing imbalances is reduced. As a result, the rotor runs more smoothly and the rotational movement is easier to control.

A particularly preferred embodiment of the invention provides that two complementary adjusting magnet devices each have at least one radially projecting element, in particular an axial section, which projects at least partially radially from the respective shaft to such an extent that the corresponding areas of the complementary adjusting devices at least partially overlap in axial projection. This can be realized, for example, by one or more disk-like structures of an adjusting magnet device, each of which engages in corresponding free spaces, preferably annular grooves, of the respective complementary adjusting magnet device. If the magnetic poles of the adjusting magnet devices are arranged radially on the outside in the corresponding areas, i.e., in particular in the disk-like structures, this results in spatial entanglement of the magnetic poles of the complementary adjusting magnet devices with one another. In this case, the magnetic interaction no longer takes place only via the opposing tangential surfaces of the adjusting magnet devices. Instead, the interlocked arrangement allows the magnetic poles to be brought further into the field of the respective assigned magnetic pole of the complementary adjusting magnet device. This strengthens the magnetic coupling between the adjusting magnet devices, i.e., in particular the maximum achievable correction force. In the case of several, in particular axially offset, radially projecting elements—for example in the form of several parallel disc-like structures—a magnetic pole of an adjusting magnet device preferably penetrates into the free space provided in the complementary adjusting magnet device in such a way that the magnetic field of two or more of the magnetic poles adjacent to the free space acts on it in each case, thus further strengthening the coupling.

A higher degree of integration can be achieved by at least one of the adjusting magnet devices being at least substantially integrated into the associated shaft. In this case, no parts or at least only small parts of the adjusting magnet device protrude beyond the center radius of the shaft in the area of the adjusting magnet device. This is particularly advantageous in the case of a closely adjacent arrangement of the shafts. In this case in particular, but also independently of this, a corresponding integration of at least one rotor magnet device is also preferred. An integration of both an adjusting magnet device and a rotor magnet device does not have to be provided on the same shaft, but can also be provided on different shafts.

A further starting point for influencing the compensation of errors in the coupling of the rotors via the rotor magnet devices can be created by at least one of the adjusting magnet devices being axially displaceable along the associated shaft. In this way, for example, it is possible to react to imbalances occurring locally in the axial direction or to torsion of the rotor or shaft occurring temporarily and/or periodically. Alternatively or additionally, at least one of the rotor magnet devices arranged in the stator can also be axially displaceable and/or offset relative to the complementary rotor magnet device.

According to the invention, it is not absolutely necessary for an adjusting magnet device to have only one magnet group at a specific axial position, for example, in the form of a ring of magnets or magnet poles arranged around the shaft. Rather, in a preferred embodiment, a plurality of axially offset magnets and/or magnet groups associated with an adjusting magnet device may also be provided. Such an adjusting magnet device can thus also have a plurality of magnet groups arranged in a ring, wherein the various magnets or magnet groups can be arranged both directly adjacent to one another in the axial direction and spaced apart from one another. Furthermore, different magnet groups of an adjusting magnet device may also have different numbers of magnet poles. Furthermore, the magnet groups are preferably adjustable independently of each other by adjusting their rotational angular position relative to the complementary adjusting magnet device of the other shaft.

Smooth running of the rotors is achieved by continuous magnetic interaction, in particular between two complementary adjusting magnet devices. For this purpose, in an adjusting magnet device with axially offset magnets, these are rotated relative to each other about the shaft axis. In this case, a spiral shape or a helical arrangement of identical magnet poles around the shaft axis is particularly preferred. When the rotors rotate, two magnetic poles of the mutually complementary adjusting magnet devices initially interact with each other. If rotation is continued, these magnetic poles move away from each other again, while the axially adjacent magnetic poles interact more strongly with each other. Due to the helical arrangement of the same magnetic poles around the shaft axis, this sequence continues in the axial direction as the rotors rotate and starts again after complete rotation.

A rotational adjustment of the adjusting magnet device relative to the associated shaft by a certain angle of rotation to compensate for the disturbing effects described at the beginning also has the same effect for all magnet poles in a helical arrangement. However, in this way the periodic occurrence of peaks in the correction force acting between the adjusting magnet devices is avoided. The correction force becomes maximum when two complementary magnetic poles of the adjusting magnet devices reach the smallest distance from each other as a result of rotation. If rotation is continued, the correction force initially decreases again until the next pair of magnetic poles interact with each other. The periodic action of the force peaks can cause undesirable vibrations, resulting in uneven running of the rotors. An almost continuous distribution of the corrective force acting between the magnetic poles of two complementary adjusting magnet devices over part of the circumference of the adjusting magnet device, preferably over its entire circumference, can considerably reduce the aforementioned effect.

A helical arrangement of the magnetic poles is particularly preferred, in which the interaction of the first magnetic poles at one axial end of the adjusting magnet device follows on as seamlessly as possible from the interaction of the last magnetic poles at the other axial end of the adjusting magnet device. For this purpose, the helical line described by the magnetic poles around the rotor preferably performs a complete revolution or an integral number of revolutions. In this case, the first and the last pair of magnetic poles of the adjusting magnet device behave as if they were directly adjacent and would continue the helix. Thus, during the rotation of the rotors, there is no significant interruption in the mutual coupling or in the action of the correction force between the adjusting magnet devices.

One or more of the adjusting magnet devices can be connected to the shaft by a corresponding support device. For this purpose, the supporting device, which is in particular a sleeve preferably made of aluminum, is arranged in a suitable manner on the shaft. If an adjusting device is first produced on a supporting device and then pushed or otherwise applied to the respective shaft by means of the latter, this considerably simplifies the design of the rotor or electric motor as a whole. In addition to inexpensive manufacture, this is also associated with easier maintenance and repair. For these purposes, the adjusting magnet device can be removed from the shaft with little effort and repaired or replaced outside the electric motor.

The present invention also applies to a vacuum pump which is driven by an electric motor according to the invention. The vacuum pump according to the invention is in particular a rotary piston pump or a Roots pump or a screw pump. In general, the vacuum pump according to the invention has at least two displacement elements which are rotationally driven by the electric motor. However, the pump is not limited to a specific type of displacement elements. A combination of different displacement elements, for example in the form of several downstream pump stages, is also possible.

The vacuum pump according to the invention is designed in particular for medium and low pumping rates. Preferably, it has a pumping speed of less than 50 $m^3/h$.

In a special embodiment, at least one of the displacement elements has an additional rotor magnet device so that a magnetic coupling of the rotors also exists in the pump chamber. Alternatively or additionally, the adjusting magnet device of the respective shaft or an additional adjusting magnet device can be provided on or in the displacer element of the shaft. This further reduces the degree of integration and thus the size of the pump. Furthermore, an additional coupling and/or adjusting option to compensate for rotational angle misalignments is provided by an arrangement in the area of the displacement elements where superimposed rotational vibrations or other synchronization fluctuations or disturbances of the synchronous operation of both rotors have the greatest negative effect.

A corresponding sensing device is preferably provided to detect the rotational position or the rotational speed of a rotor. In particular, the vacuum pump has a corresponding sensor circuit that interacts with a complementary transmitter magnet of the rotor. In a particularly preferred embodiment, at least one of the adjusting magnet devices of a rotor comprises a magnet which fulfills the function of a transmitter magnet in such an arrangement.

In the following, the invention is explained in more detail by means of examples of embodiments. In this context, all the features described and/or shown in drawings each constitute independent aspects of the invention, irrespective of their combination in the embodiment examples.

DETAILED DESCRIPTION OF THE INVENTION

Figure 1:
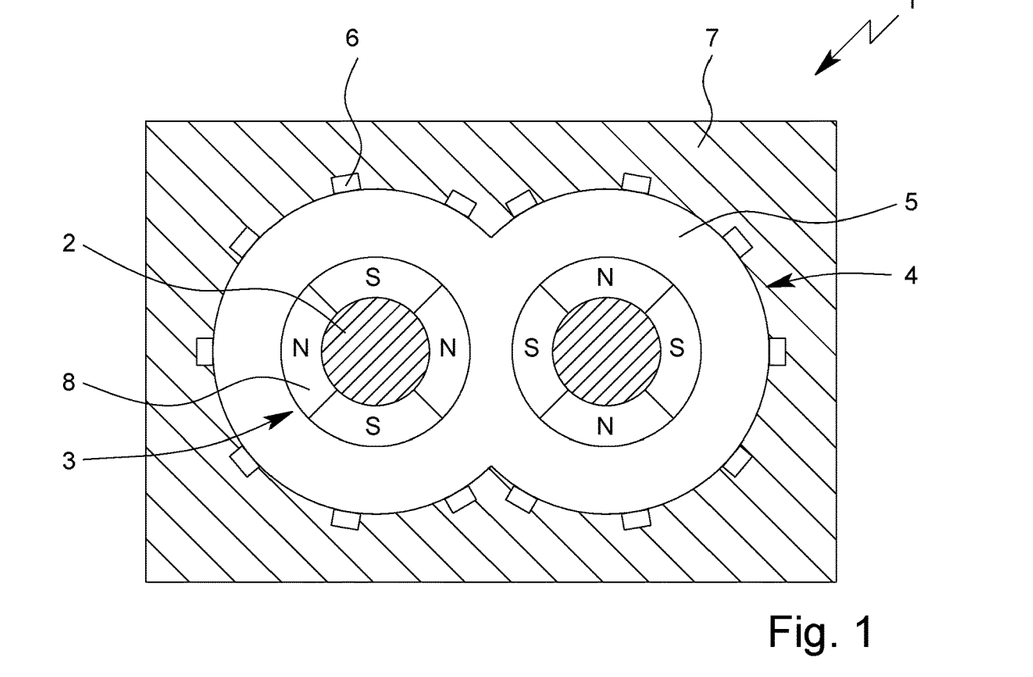
FIG. 1 is a schematic sectional view of an electric motor according to the invention in the drive area.
Figure 3:
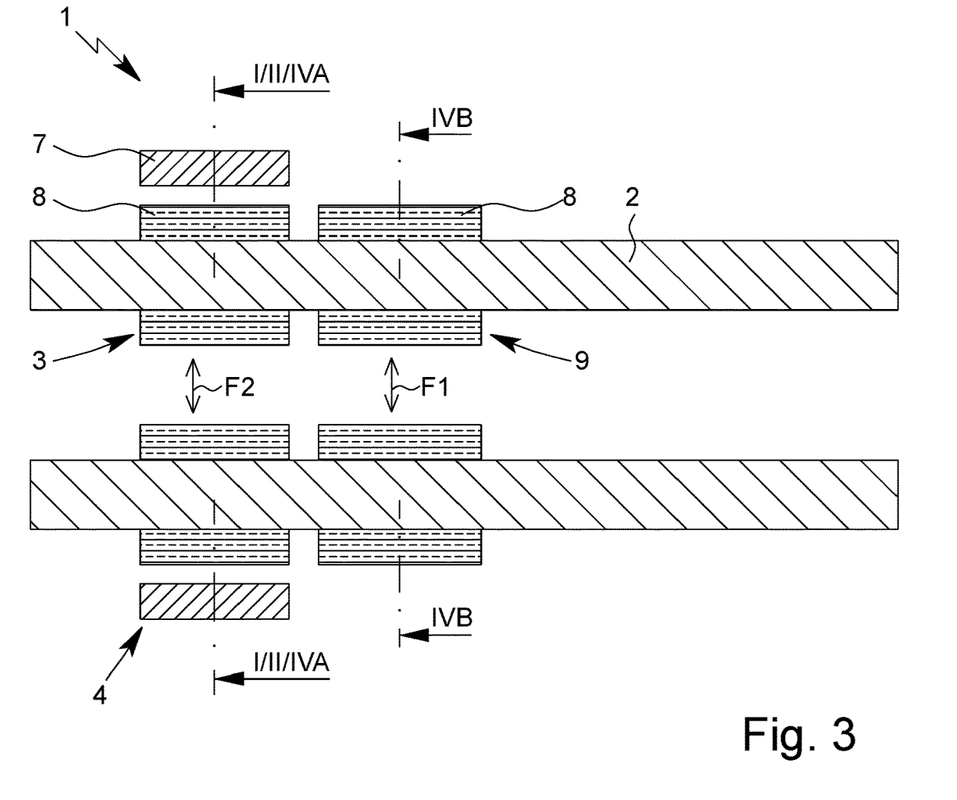
FIG. 3 is a schematic longitudinal section of the electric motor according to the invention.

FIG. 1 shows a cross-sectional view of an electric motor 1 according to the invention with two shafts 2. In the present representation, the sectional plane runs perpendicular to the longitudinal or rotational axis of the shafts 2 in the area of the actual electric motor drive, as indicated in FIG. 3 by a dash-dotted line I/II/IVA. The electric motor 1 is preferably designed as a two-shaft synchronous motor.

Figure 2:
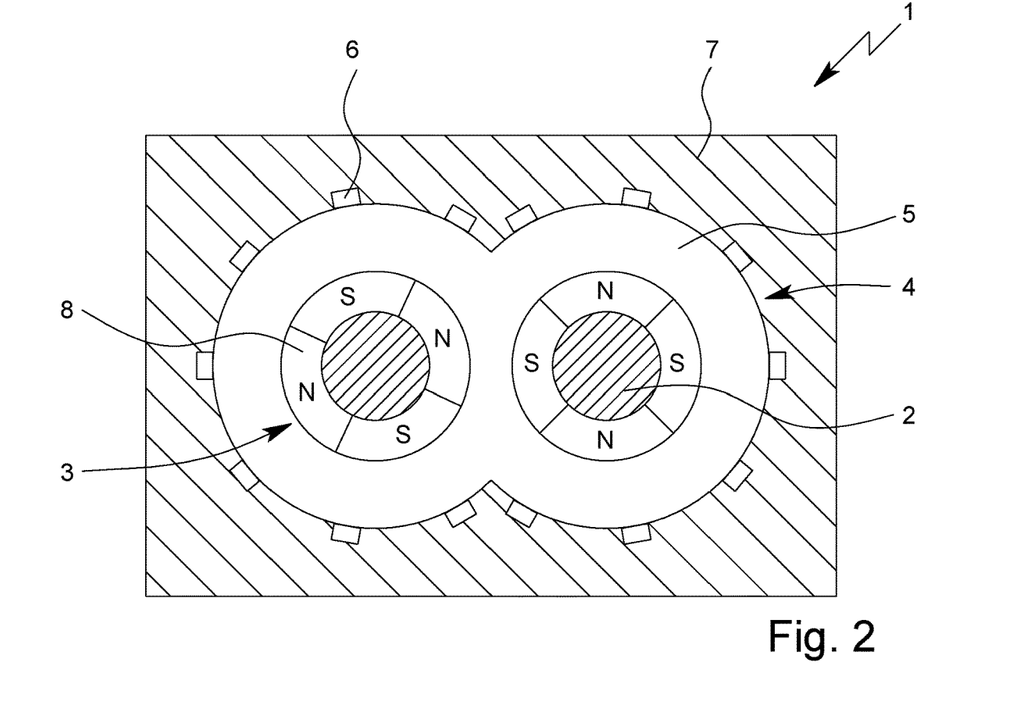
FIG. 2 is a representation of the electric motor of FIG. 1 corresponding to FIG. 1 in an alternative operating state.

The shafts 2 run in particular parallel and each carry a rotor magnet device 3 which is connected to the shaft 2 in a rotationally fixed manner During operation of the electric motor 1, the rotor magnet devices 3 of both shafts serve to drive in particular counter-rotational movements of the shafts 2. In the present case, they are arranged in a common stator 4, as shown in FIGS. 1 and 2. The stator 4 is designed to generate a magnetic field which interacts with the rotor magnet devices 3 and causes them to rotate in the sense of a drive when there is a corresponding periodic change in the stator field.

In the operating state of the electric motor 1, both rotor magnet devices 3 thus equally experience the effect of the magnetic field generated by the stator 4. Of course, this does not mean that the shape of the magnetic field and/or the field strength at the locations of both rotor magnet devices 3 must be identical. Rather, this can be designed differently depending on the application. Nevertheless, when the stator 4 is switched on, i.e., in particular when it is electrically energized, both rotor magnet devices 3 experience the generated field simultaneously and synchronously with respect to all changes or fluctuations of the field. This ensures that no synchronization fluctuations or speed differences of the two shafts 2 are to be expected in this respect.

The stator 4 has a stator interior 5 in which the rotor magnet devices 3 are arranged. In the stator interior 5, the magnetic field of the stator 4 is generated by means of a field generator 6, preferably by means of a plurality of field generators 6. The field generators 6 are in particular coils which generate a magnetic field when electric current flows through them. The number and arrangement of the field generators 6 can influence the shape and local field strength of the magnetic field in the stator interior 5.

The stator interior 5 is formed in particular in a housing 7. The housing 7 can extend right up to the stator interior 5. However, an embodiment is also possible in which the housing 7 is only an outer casing for the movable and electrically conductive components and thus serves to protect a user. The stator interior 5 is ultimately formed by the arrangement of the field generators 6 and its shape is significantly influenced. In functional terms, the stator interior 5 is the area surrounded by the field generators 6 in which the magnetic field for driving the rotor magnet devices 3 is generated. However, a section of the housing 7 that is adapted as precisely as possible to this, as shown in FIGS. 1 and 2, can be advantageous in terms of thermal and/or electromagnetic shielding or with regard to noise insulation.

During operation of the electric motor 1, the rotor magnet devices 3 are set in rotation by a changing magnetic field of the stator 4. As described previously, the field of the stator 4 is generated in particular by field generators 6. If a constant direct current flows through coils used as field generators 6, a static magnetic field is generated in the stator interior 5, according to which the rotor magnet devices 3 align themselves with respect to their rotational position.

For this purpose, the rotor magnet devices 3 comprise at least one magnet for interacting with the field of the stator 4. Accordingly, the rotor magnet devices 3 each have at least two magnetic poles 8—a magnetic north pole N and a magnetic south pole S. If an external field of sufficient strength is now applied in the region of the rotor magnet device 3, the magnetic poles 8 align themselves in accordance with this field, causing the rotor magnet device 3 to rotate together with the shaft 2. A periodic change in the external field causes further alignment of the magnetic poles 8 in each case, so that the rotational movement is continued and can be maintained continuously.

In the absence of an external field, in particular the stator field, the interaction of the magnetic poles 8 of the two adjacently arranged rotor magnet devices 3 becomes apparent. The rotor magnet devices 3 align themselves with respect to their rotational angular position in such a way that two different magnetic poles 8 of the two rotor magnet devices 3 face each other and are spaced as close as possible, according to the illustration of FIG. 1. This interaction results in a coupling effect between the rotor magnet devices 3 in the sense of a magnetic gear.

In the presence of the magnetic field generated by the stator 4, both of the aforementioned interactions, i.e., the reaction of the magnets or magnetic poles 8 to the external field and the mutual coupling of the magnetic poles 8 of the complementary rotor magnet devices 3 to one another, occur together in a competing manner. For an undisturbed operation, it is generally attempted in the manufacture of the electric motor 1 that the alignment of the rotor magnet devices 3 with respect to the field of the stator 4 and with respect to the field of the magnetic poles 8 of the respective complementary rotor magnet device 3 correspond as far as possible. In this case, an alignment of the rotor magnet devices 3 as shown in FIG. 1 is to be expected even when the (static) stator field is activated.

However, due to manufacturing tolerances and limited assembly accuracy in practice, the case shown in FIG. 2 often occurs when a constant magnetic field is generated by the stator 4, for example, by energizing it with a DC current that is invariant over time. Since the external field generated by the stator 4 is generally greater in magnitude than the coupling between the magnetic poles 8 of the rotor magnet devices 3, these align themselves primarily with the external field in this case. If the respective rest positions of the rotor magnet assemblies 3 with respect to the external field on the one hand and with respect to the field of the other rotor magnet assembly 3 on the other hand deviate from each other due to manufacturing reasons, the case shown in FIG. 2 occurs. In this case, the rotor magnet devices 3 attain a position which largely corresponds to the rest position with respect to the stronger magnetic field of the stator 4. However, this position represents a deflection from the rest position with respect to the mutual magnetic interaction of the rotor magnet devices 3. This disproportion also continues during the rotation of the rotor magnet devices 3 in a dynamically changing stator field when the field generators 6 are energized in a particularly periodically changing manner.

The previously described deflection of the rotor magnet devices 3 relative to the rest position with respect to their mutual coupling results in a tension in the form of a resulting relative force, corresponding to the spring tension in a deflected mechanical spring. This force generates a relative torque between the rotor magnet devices 3 or the shafts 2, respectively. This can become problematic, particularly at high speeds of the electric motor 1, in that an oscillatory system is formed due to the tensioning of the rotor magnet devices 3 with respect to each other. During operation of the electric motor 1, this can result in a superimposed rotational vibration of the rotor magnet devices 3 or the shafts 2 relative to each other. As the amplitude of this superimposed rotational vibration increases, the coupling of the rotor magnet devices 3 and thus the synchronism of the rotational movement of both shafts 2 becomes more and more out of the desired range. This is particularly critical if the oscillating system or the superimposed rotational oscillation starts to resonate at a certain speed. Due to the build-up of the oscillation amplitude, a collision of components driven by the electric motor 1 or even their destruction can occur in such a case.

This is where the invention comes in, in that at least one adjusting magnet device 9 is arranged on each of the two shafts 2. Two adjusting magnet devices 9 preferably form a complementary cooperating pair.

The adjusting magnet devices 9 are arranged on the shaft 2 in addition to the rotor magnet devices 3, as shown by way of example in FIG. 3. At least one of the adjusting magnet devices 9 is arranged in particular outside the stator 4. In the illustration of FIG. 3, this is made visually clear by a limitation of the housing 7 in the axial direction to the area of the rotor magnet devices 3. It is understood, however, that the housing 7 can also enclose the adjusting magnet devices 9 as well as other parts of the electric motor 1.

The effect of the adjusting magnet devices 9 is based on the fact that at least one of the adjusting magnet devices 9 can be adjusted by means of rotation relative to the associated shaft 2 or can be changed in its rotational angular position relative to the respective complementary adjusting magnet device 9 of the respective other shaft 2. For this purpose, the adjusting magnet device 9 is fastened to the shaft 2 in such a way that, although it is also rotated during a rotation of the shaft 2, it can be changed in its rotational angular position relative to the shaft 2 and thus relative to the complementary adjusting magnet device 9 of the other shaft 2 and can be fixed in this changed position.

Figure 4A:
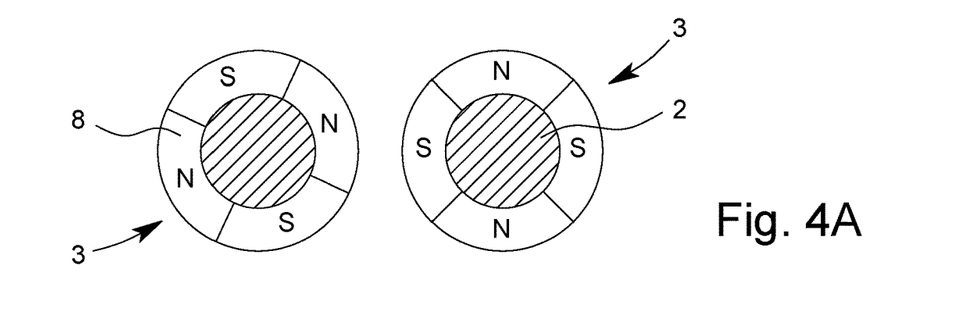
FIG. 4A is a cross-sectional view of two rotor magnet assemblies.
Figure 4B:
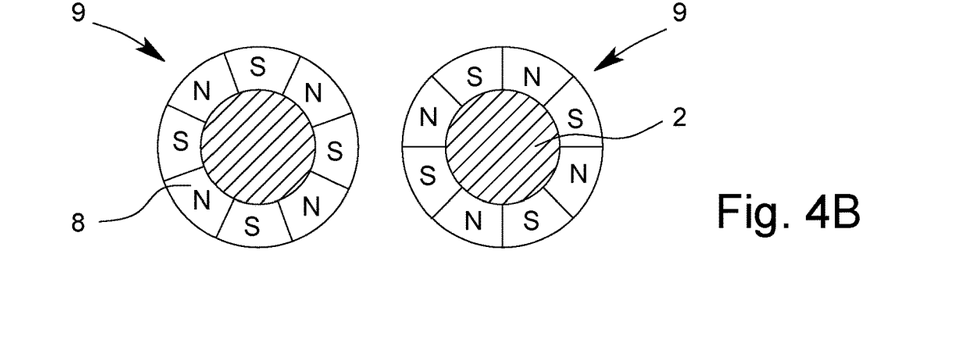
FIG. 4B is a cross-sectional view of two adjusting magnet devices.

FIGS. 4A and 4B illustrate the relative orientations of the rotor magnet devices 3 and the adjusting magnet devices 9. Here, FIG. 4A corresponds to the section through the rotor magnet devices 3 corresponding to the situation shown in FIG. 2, but without the surrounding devices of the stator 4 as well as the housing 7. It can be seen that the magnetic poles 8 of the two rotor magnet devices 3 facing each other most closely are not in a position corresponding to the rest position due to their mutual attraction. In this rest position, the magnetic north pole N of the present left-hand rotor magnet device 3, which is closest to the present right-hand rotor magnet device 3, would be aligned as a reference magnet or reference magnetic pole in such a way that its center point represents the closest point to the right-hand rotor magnet device 3. The mentioned center point of the magnetic north pole N is geometrically related to the circumferential direction in the present example. Functionally, this is in particular the point at which the magnetic field lines emerge vertically and/or with the highest density. The same applies in a corresponding manner to the magnetic south pole S of the other rotor magnet device 3. The rest position would ultimately correspond to the alignment of the rotor magnet devices 3 shown in FIG. 1.

The case of tensioning of the rotor magnet devices 3 against each other shown in FIG. 4A, including its negative consequences described above, can be compensated for, or at least reduced to an acceptable level by the adjusting magnet devices 9 provided according to the invention. A section through the adjusting magnet devices 9 shown in FIG. 3 according to section plane IVB is shown in FIG. 4B. Compared to FIG. 4A, it can be seen that the adjusting magnet devices 9 are also rotated by a certain relative angle with respect to the position corresponding to the rest position by means of the magnetic poles 8 of the adjusting magnet devices 9. A certain correction force F1 now acts between the adjusting magnet devices 9 in addition to the coupling force F2 acting between the rotor magnet devices 3.

In the statically considered case of the tensioning of the rotor magnet devices 3 against each other shown in FIG. 4A, the correction force F1 generates a relative torque between the adjusting magnet devices 9 which opposes the resulting relative torque caused by the coupling force F2 as a result of the deflection of the rotor magnet devices 3 relative to their rest position. According to the illustration of FIG. 3, the rotor magnet devices 3 and the adjusting magnet devices 9 of a common shaft 2 are rotationally coupled to each other via the same. Ideally, the unwanted torque caused by the coupling force F2 and the counter-torque generated by the correction force F1 by means of the adjusting magnet devices 9 thus largely balance each other with respect to the shaft 2.

The degree to which the undesirable tensioning of the rotor magnet devices 3 relative to one another shown in FIG. 4A occurs cannot generally be predicted with sufficient accuracy. Therefore, the solution according to the invention permits an adjustment of the rotational angular position of the adjusting magnet devices 9 relative to each other in order to adapt the correction force F1 or the counter-torque caused thereby to the respective application situation in each individual case.

In the dynamically considered case, i.e., when the shafts 2 rotate during operation of the electric motor 1, the above-described formation of a superimposed rotational vibration can occur. If the amplitude, i.e., the relative angle of rotation of the rotor magnet devices 3, increases in the course of a build-up of the rotational vibration, the adjusting magnet devices 9 are also rotated more strongly relative to one another due to the coupling with the respective rotor magnet devices 3. Depending on the setting of the basic relative alignment of the complementary adjusting magnet devices 9, the correction force F1 in the case of high amplitudes causes a correspondingly increased torque between the shafts 2 in the opposite direction to the oscillation, as a result of which the disruptive rotational oscillation is damped and abates entirely.

In the previously described procedure, it is advantageous if the correction force F1 is greater than or at least equal in amount to the coupling force F2. This can be understood in particular with regard to the comparison of two pairs of respectively complementary rotor magnet devices 3 and adjusting magnet devices 9. Alternatively, or additionally, this condition can also apply to the sum of all occurring correction forces F1 and the sum of all occurring coupling forces F2 combined (if a plurality of adjusting magnet devices 9 and/or rotor magnet devices 3 is provided).

The comparison of FIGS. 4A and 4B shows that the rotor magnet devices 3 and the adjusting magnet devices 9 do not have to have the same number of magnetic poles 8. The respective number rather depends on how fine the coupling between the rotor magnet devices 3 or the adjustability of the correcting effect of the adjusting magnet devices 9 should be in the concrete application.

The rotor magnet devices 3 and/or the adjusting magnet devices 9 each comprise at least one magnet from which the magnet poles 8 are provided. The magnet is preferably sintered and/or can be attached to the shaft 2 or to a separate, but for the sake of clarity not shown in detail, supporting device of the rotor magnet device 3 or adjusting magnet device 9 by adhesive bonding, pressing, shrinking on or otherwise by material, force-locking and/or form-fitting.

Particularly preferably, a rotor magnet device 3 and/or an adjusting magnet device 9 of the electric motor 1 according to the invention has a magnetic multipole. For reasons of simplification, the representation of a magnetic quadrupole (FIGS. 1, 2, 4A) or an eightfold multipole (FIG. 4B) is selected here. In principle, however, it can be an n-fold multipole, i.e. a higher-order multipole, in which, according to the invention, there is no fundamental upper limit to the number of magnetic poles 8. An eight-fold multipole, further preferably a 12-fold multipole and particularly preferably a 24-fold multipole, has proved to be a particularly suitable compromise between the necessary design effort and a good functional effect. The above values correspond in particular to lower limits for the preferred number of poles of the multipole.

The magnets of the rotor magnet devices 3 and/or the adjusting magnet devices 9 are in particular permanent magnets which generate a magnetic field independently of an external power supply and thus develop a coupling or correction effect. In a preferred embodiment, however, the magnets of at least one rotor magnet device 3 and/or one adjusting magnet device 9 are designed as electromagnets preferably having one or more contact brushes. Alternatively or additionally, such an electromagnet can also be designed for contactless operation, in particular by means of induction. Furthermore, induced eddy currents can also contribute to counteracting synchronization fluctuations. Thus, the strength of the correction force F1 and/or the coupling force F2 can be influenced in particular continuously and/or the effect associated therewith can be switched on and off in each case. It is understood that permanent magnets and electromagnets can also be provided in combination on a rotor magnet device 3 or adjusting magnet device 9 or on different rotor/adjusting magnet devices 3, 9.

In particular for the adjusting magnet devices 9, but also for the rotor magnet devices 3, a cylindrical shape is advantageous with regard to the rotational movement performed by them during operation of the electric motor 1. Accordingly, an adjusting magnet device 9 and/or a rotor magnet device 3 may have a cylindrical base body. In this case, the axis of rotational symmetry of the cylinder is in particular parallel to, or coincides with, the longitudinal and rotational axis of the shaft 2, as shown in FIG. 3.

Figure 7:
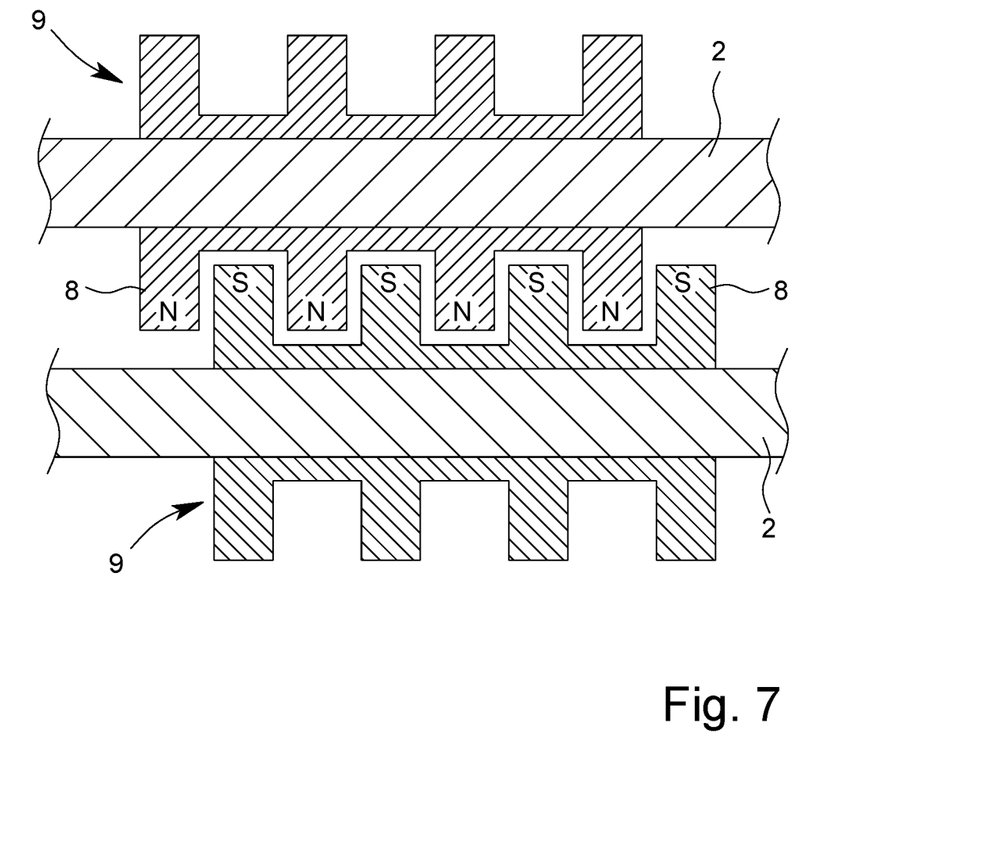
FIG. 7 is a schematic longitudinal section of a preferred embodiment of two adjusting magnet devices.

A basic shape of the basic body of the adjusting magnet devices 9 or rotor magnet devices 3 which is cylindrical on average does not preclude the possibility of one or more elements projecting radially from a basic cylindrical shape, in particular in the form of disk-like structures. An overall rotationally symmetrical design with respect to the cross section perpendicular to the axis of rotation is advantageous in this case. FIG. 7 shows an example of a corresponding embodiment of the adjusting magnet devices. Here, in particular, the magnetic poles 8 are located in the radially outer area of the projecting elements.

The formation of disk-like structures with intervening free spaces, in this case in the form of circumferential annular grooves, allows spatial interleaving of the associated magnetic poles 8 without the risk of mechanical collision of components even in the event of strong synchronization fluctuations.

In the preferred embodiment shown, one magnetic north pole N of each adjusting magnet device 9 is located between two magnetic south poles S of the complementary adjusting magnet device 9, and vice versa. The adjusting magnet devices 9 are thus more strongly coupled to each other than in the case of a merely opposite arrangement of the magnetic poles 8, i.e., without the entanglement shown here. Thus, a greater corrective force can be exerted in the event of synchronization fluctuations between the shafts 2. As a result of the rotation of the adjusting magnet devices 9, the magnetic north poles N and south poles S alternately move to the position closest to each other, so that the ratio of the north poles N and south poles S shown in FIG. 7 is periodically reversed in each case.

It is understood that, deviating from the illustration according to FIG. 7, an irregular or asymmetrical arrangement of projecting elements and corresponding free spaces can also be provided. Furthermore, one or both adjusting magnet devices 9 can also have several separate, axially spaced discs, rings or the like which interact with each other in the manner described above.

Conversely, an adjusting magnet device 9 and/or a rotor magnet device 3 can also be integrated into the shaft 2 as an alternative or in addition in order to achieve the most compact design possible. For this purpose, the shaft 2 can have a correspondingly reduced diameter in the area of the respective adjusting magnet device 9 or rotor magnet device 3, so that as a result there are no components of the adjusting magnet device 9 or rotor magnet device 3 projecting beyond the maximum radius of the shaft 2 in the area concerned.

Furthermore, it is by no means necessary that the adjusting magnet devices 9 are arranged close to the rotor magnet devices 3 in the manner shown in FIG. 3. A corresponding spacing along the axis of the shaft 2 is also possible according to the invention. In a particularly preferred embodiment, at least one of the adjusting magnet devices 9 can even be designed to be displaceable in the axial direction, i.e., along the shaft 2.

The sectional views of FIGS. 1, 2, 4A and 4B may suggest that the rotor magnet devices 3 or adjusting magnet devices 9 may have a plurality of magnets or magnet poles 8 along their circumference but have a constant design in the axial direction. According to the invention, however, a design is also possible in which several magnets, in particular of different design, are provided in an adjusting magnet device 9. In particular, this can be a sequence of magnets arranged preferably in a ring around the shaft 2, whereby the number of magnetic poles 8 of each ring can be different.

Furthermore, it is also possible that not only directly adjacent magnets are provided in the axial direction, but also a spacing between axially offset magnets or in particular ring-shaped magnet groups can be set up. In this way, structural conditions can be taken into account depending on the individual application.

Axially offset magnets can also be offset by different angles of rotation. In this case, in particular, an oblique interlocking of the magnets or magnet poles 8, preferably in the form of a helical arrangement of the magnet poles 8 around the shaft 2, is possible, whereby an almost continuous effect of the correction force F1 occurs with greater running smoothness.

Furthermore, several axially offset and independently adjustable magnets or magnet groups of an adjusting magnet device 9 as well as a plurality of adjusting magnet devices 9 on a shaft 2 can also be used to react to disturbing phenomena other than pure rotational vibration. These include, for example, a superimposed bending vibration or a torsional vibration of the shaft 2.

The support device for magnets of the adjusting magnet device 9 or the rotor magnet device 3 and/or for the adjusting magnet device 9 or the rotor magnet device 3 itself, which is not shown in detail for reasons of simplification, is designed in particular as a sleeve. Preferably, an aluminum sleeve is used here. Particularly preferred is an embodiment in which a supporting device is provided which supports at least one of the adjusting magnet devices 9 as a whole, so that it can first be manufactured completely and then applied to the shaft 2 by means of the supporting device. In particular, one or more magnets, preferably in the form of bar magnets, can be inserted into the sleeve.

A supporting device, in particular a sleeve-like one, can additionally serve as a heat sink for cooling the magnets. Otherwise, in the case of permanent magnets, there is a risk of thermal demagnetization, if the temperature rises too much during operation.

Figure 5:
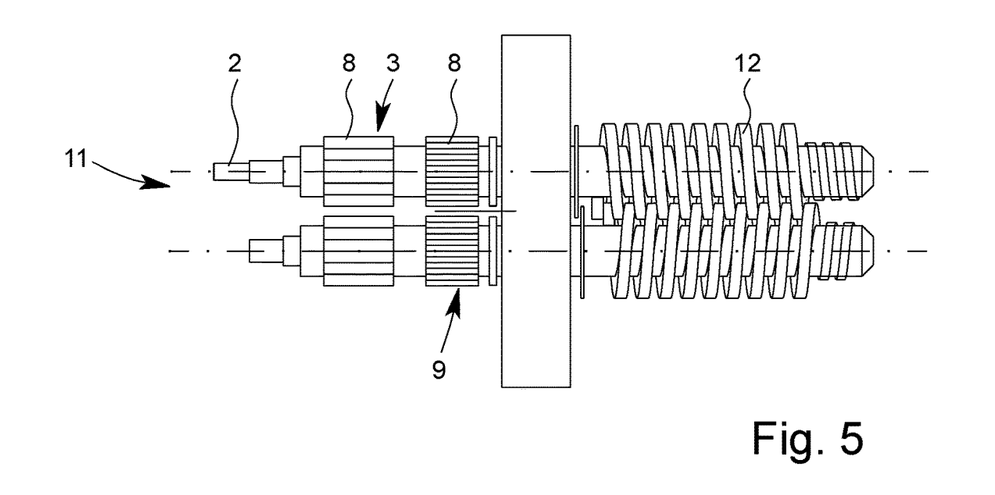
FIG. 5 is a schematic view of two rotors of a vacuum pump according to the invention.
Figure 6:
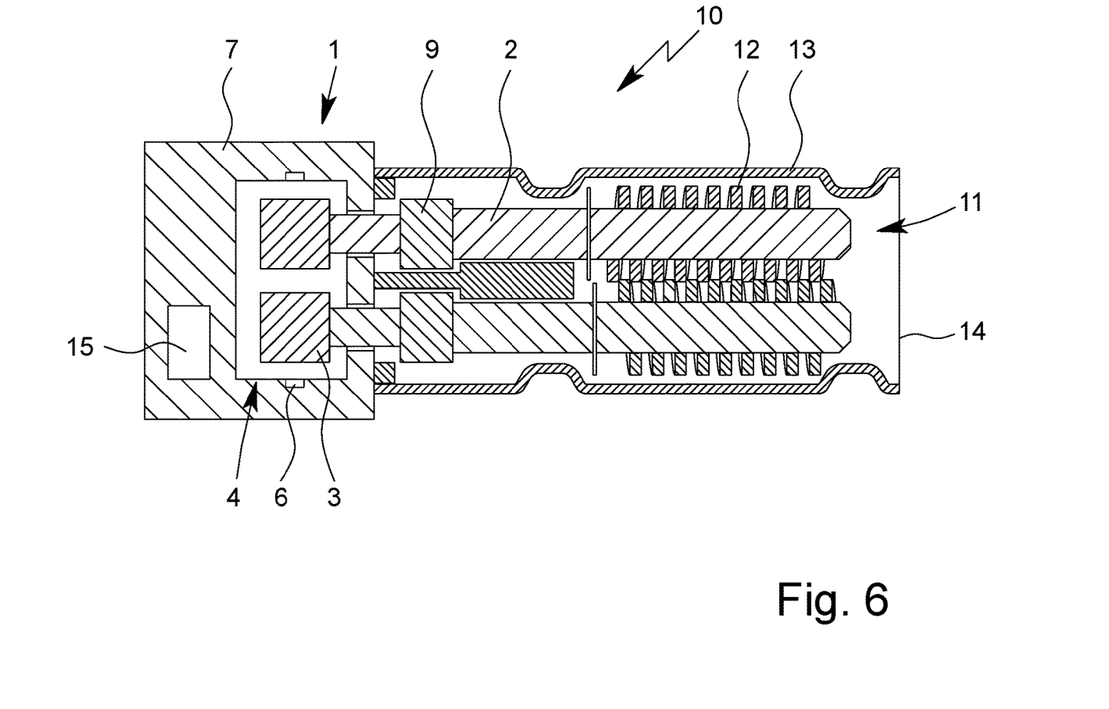
FIG. 6 is a schematic longitudinal section of a vacuum pump according to the invention.

The electric motor 1 according to the invention is particularly suitable for driving a vacuum pump 10, as exemplarily shown in FIG. 6. In such a vacuum pump 10, the electric motor 1, in particular as a two-shaft synchronous motor, serves to drive two rotors 11, which are shown in FIG. 5 in schematic plan view. A rotor 11 of the vacuum pump 10 comprises, in addition to the shaft 2, at least one rotor magnet device 3 and an adjusting magnet device 9, in particular also one or more displacement elements 12. In the example shown here, the displacer element 12 is designed as a screw for a screw pump. Here, a non-compressing embodiment is shown as an example, in which the screw has a constant pitch. It is understood that a design with variable pitch, in particular for compression, can nevertheless also be provided. Also possible, for example, are displacement elements 12 in the form of rotary or rolling pistons or displacement elements 12 based on a comparable principle.

In accordance with the schematic exemplary representation of FIG. 6, the vacuum pump 10 according to the invention is provided in particular to drive the two rotors 11 by means of the electric motor 1 according to the invention. Here, the previously described function of the adjusting magnet devices 9 is used. In the case of the vacuum pump 10 shown here, the parallel rotors 11 run, on the one hand, in the region of the drive-effective part of the electric motor 1, i.e., in particular in the stator 4, and/or a housing 7 of the electric motor 1.

Furthermore, the shafts 2 of the rotors 11 are extended in such a way that they run through a pump housing 13 and are rotatably mounted there. The displacement elements 12 are arranged in the front part of the pump housing 13. They cooperate there in such a way that a pumped medium, for example a fluid to be evacuated from an enclosed space, preferably a gas, is drawn into the pump housing 13 via a suction port 14 and is transported further by the displacement elements 12. In the conveying direction beyond the displacement elements 12, the transported fluid then leaves the pump housing 13 through an outlet connector. In the example shown here, this is arranged in a direction perpendicular to the image plane and is therefore not shown in the present sectional view.

The displacement elements 12 preferably do not touch each other or the pump housing 13 during operation. Nevertheless, sufficient sealing must be ensured between the displacement elements 12 or with respect to the pump housing 13. Therefore, extremely small gap distances between the components involved are used here. The problems described above with the occurrence of synchronization fluctuations, synchronization errors between the rotors 11 and in particular overlapping rotational vibrations of the rotors 11 that build up can thus quickly have a critical effect on the operation of the vacuum pump 10.

In a particularly preferred embodiment, at least one of the displacement elements 12 can have an additional rotor magnet device 3. In this way, the coupling between the two rotors 11 can be strengthened if respective complementary interacting displacement elements 12 additionally form a further magnetic gear by means of corresponding rotor magnet devices 3.

Alternatively, or additionally, a preferred embodiment may provide that one or more adjusting magnet devices 9 are integrated into the displacer elements 12. This can be one of the primary adjusting magnet devices 9 or an additional adjusting magnet device 9. The corrective action by the adjusting magnet device 9 can thus act directly where negative consequences would first become apparent in the event of a malfunction of the aforementioned type.

The electric motor 1 and/or the vacuum pump 10 can or can further have a control device 15, in particular an electronic control device, by means of which, for example, the rotational speed of the rotors 11, the strength and/or phase of the stator field, the delivery rate of the vacuum pump 10, the noise level in the environment of the vacuum pump 10, the power consumption of the electric motor 1 and/or a temperature value can be detected and/or monitored. Furthermore, it is also possible to control the aforementioned and/or further parameters by means of the control device 15.

A respective device can be provided for detecting the rotational speed and/or the rotational position of one or both rotors 11. For this purpose, the vacuum pump 10 preferably has a corresponding sensor circuit, which is integrated in particular in the control device 15. By means of the sensor circuit, a sensor magnet can be read out, which indicates to the sensor circuit or to the control device 15 a complete or partial rotation of the rotor. A corresponding transmitter magnet is preferably integrated in at least one of the adjusting magnet devices 9, so that no additional component has to be added to the rotor 11 for monitoring the rotational movement. Particularly preferably, a magnet or a magnetic pole 8 of the adjusting magnet device 9 is perceived as a transmitter magnet by the complementary sensor circuit.

What is claimed is:

1. An electric motor, comprising:
    two rotor magnet devices respectively arranged on parallel shafts, the rotor magnet devices being arranged in a common stator in the operating state of the electric motor in such a way that they interact with one another for a mutual coupling with regard to their rotational angular position,
    wherein at least one adjusting magnet device is arranged on each of the two shafts, at least one of the adjusting magnet devices being adjustable by means of rotation relative to the associated shaft and/or being variable in the rotational angular position relative to a complementary adjusting magnet device of the respective other shaft for compensating a force acting between the rotor magnet devices of parallel shafts during operation of the electric motor by adding a correction force that is phase-shifted against a coupling force between the rotor magnet devices with respect to the rotational angular position.

2. The electric motor according to claim 1, wherein at least one of the adjusting magnet devices of each shaft is arranged outside the stator.

3. An electric motor according to claim 1, wherein between pairs of adjusting magnet devices there is a correction force which is greater than or equal in amount to a coupling force acting between a respective pair of the rotor magnet devices.

4. The electric motor according to claim 1, wherein at least one of the rotor magnet devices and/or at least one of the adjusting magnet devices has one or more sintered and/or bonded and/or pressed magnets.

5. The electric motor according to claim 1, wherein at least one of the rotor magnet devices and/or at least one of the adjusting magnet devices has a magnetic multipole.

6. The electric motor according to claim 1, wherein at least one of the adjusting magnet devices comprises an electromagnet.

7. The electric motor according to claim 1, wherein at least one of the adjusting magnet devices has a cylindrical base body and/or wherein at least one of the adjusting magnet devices has at least one radially projecting element.

8. The electric motor according to claim 1, wherein at least one of the adjusting magnet devices is integrated into the shaft.

9. The electric motor according to claim 1, wherein at least one of the adjusting magnet devices is axially displaceable along the shaft.

10. The electric motor according to claim 1, wherein at least one of the adjusting magnet devices comprises a plurality of axially offset magnets.

11. The electric motor according to claim 10, wherein the magnets of the adjusting magnet device are rotatable relative to each other about a shaft axis in such a way that a helical arrangement of identical magnet poles are formed about the shaft axis results.

12. The electric motor according to claim 1, wherein a supporting sleeve for supporting at least one of the adjusting magnet devices is arranged on the shaft.

13. A vacuum pump, comprising at least one electric motor for rotating at least two displacement elements,
    wherein the electric motor has two rotor magnet devices respectively arranged on parallel shafts, the rotor magnet devices being arranged in a common stator in the operating state of the electric motor in such a way that they interact with one another for mutual coupling with regard to their rotational angular position,
    wherein at least one adjusting magnet device is arranged on each of the two shafts, at least one of the adjusting magnet devices being adjustable by means of rotation relative to the associated shaft and/or being variable in the rotational angular position relative to a complementary adjusting magnet device of the respective other shaft for compensating a force acting between the rotor magnet devices of parallel shafts during operation of the electric motor by adding a correction force that is phase-shifted against a coupling force between the rotor magnet devices with respect to the rotational angular position.

14. The vacuum pump according to claim 13, wherein at least one of the displacement elements comprises an additional rotor magnet device and/or one of the adjusting magnet devices or an additional adjusting magnet device.

15. The vacuum pump according to claim 13, wherein at least one of the adjusting magnet devices comprises a transmitter magnet for interaction with a complementary sensor circuit.

16. The vacuum pump according to claim 13, wherein the vacuum pump is a rotary lobe pump or a screw pump with a pumping speed below 50 $m^3$/h.

* * * * *